(No Model.)
I. N. KENDALL.
METHOD OF AND DEVICE FOR TURNING DOWN THE POINTS OF SAW TEETH.
No. 348,220. Patented Aug. 31, 1886.
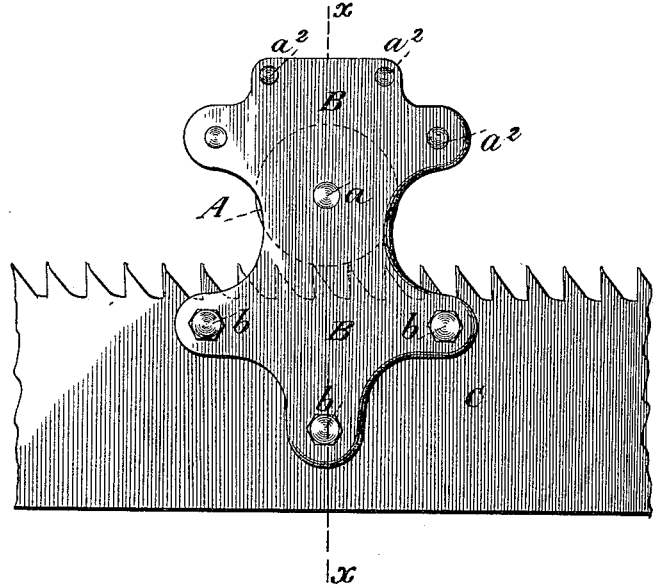
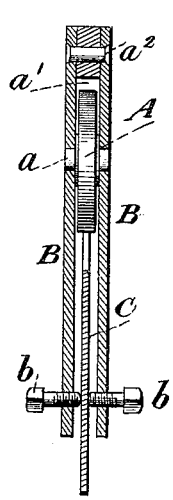
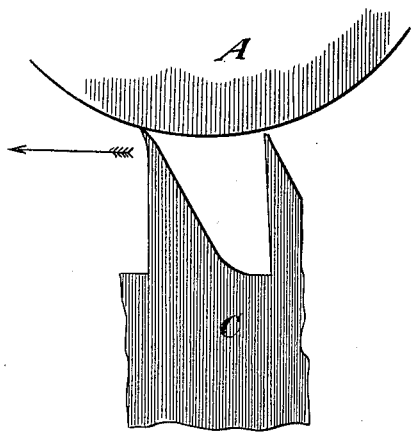
Witnesses.
A. Ruppert.
Chas. H. Mixer.
Inventor:
Isaac N. Kendall,
Per
Thomas P. Simpson,
Atty.

UNITED STATES PATENT OFFICE.

ISAAC NEWTON KENDALL, OF ROCKLAND, ONTARIO, CANADA.

METHOD OF AND DEVICE FOR TURNING DOWN THE POINTS OF SAW-TEETH.

SPECIFICATION forming part of Letters Patent No. 348,220, dated August 31, 1886.

Application filed April 30, 1886. Serial No. 200,741. (No model.)

*To all whom it may concern:*

Be it known that I, ISAAC NEWTON KENDALL, a subject of the Queen of Great Britain, residing at Rockland, in the Province of Ontario and Dominion of Canada, have invented certain new and useful Improvements in Turning Down the Points of Saw-Teeth; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of my invention is to turn down the points of saw-teeth, so as to give them a forward incline and make them take hold with more certainty and effect. The blade is thus provided with a much better cutting-edge, will do its work more evenly and thoroughly, and will not require the expenditure of the usual force to perform a given quantity of work.

Figure 1 of the drawings is a side elevation showing my invention applied to a saw. Fig. 2 is a vertical cross-section showing the relative position of the saw and roller between the plates. Fig. 3 is a detail view in side elevation of a full-sized tooth after it has been turned down by the roll.

In the drawings, A represents a steel roller journaled at $a$ between two plates, B B, which are riveted together and to an intervening spacer, $a'$, as shown at $a^2$ $a^2$ $a^2$ $a^2$ in Fig. 1 of the drawings. This steel roller is made with a diameter four times as great as the distance from point to point of two adjacent teeth, the thickness and diameter of the roller depending upon the dimensions of the particular saw upon which the operation is to be performed. The saw C is held by any suitable means between the two plates B B, while the steel roller A presses upon the points of the teeth as the device is moved over the saw from rear to front. $b$ $b$ $b$ are guide-screws which gage the position of the saw and prevent any lateral displacement. The effect of rolling pressure upon the points of the saw-teeth is to give the same forward incline to all the points, bring them into exact alignment and render their action uniform. It also imparts a superior cutting-edge which takes hold of the material with great certainty, while each successive tooth does its own work thoroughly, leaving none to be finished up by the one which comes after it.

Having thus described all that is necessary to a full understanding of my invention, what I claim as new, and desire to protect by Letters Patent, is—

1. The described method of giving a uniform forward incline to saw-teeth, which consists in rolling the points from the rear to the front of the blade, as set forth.

2. The combination of the roller A, plates B B, secured at the top to an intervening spacer, the roller A journaled at $a$ between said plates, and the guide-screws $b$, whereby a uniform forward incline may be given to teeth, as described.

In testimony whereof I affix my signature in presence of two witnesses.

ISAAC NEWTON KENDALL.

Witnesses:
G. G. DUNNING, Jr.,
J. O. KENDALL.